June 13, 1939.  E. J. CONGER  2,162,606
WHEEL DRIVE
Filed Feb. 8, 1938   2 Sheets-Sheet 1
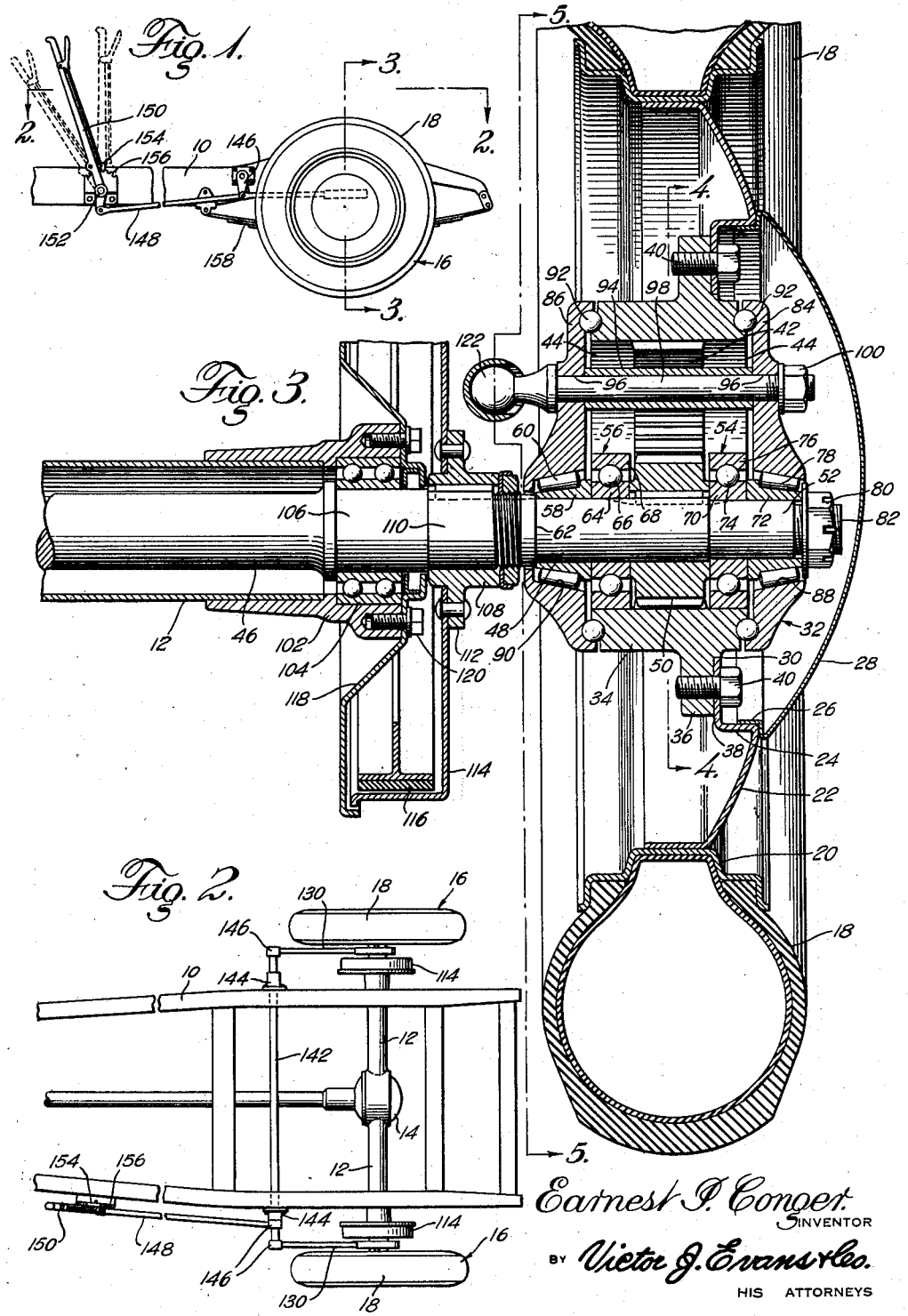
Earnest J. Conger
INVENTOR
BY Victor J. Evans & Co.
HIS ATTORNEYS June 13, 1939. E. J. CONGER 2,162,606
WHEEL DRIVE
Filed Feb. 8, 1938 2 Sheets-Sheet 2
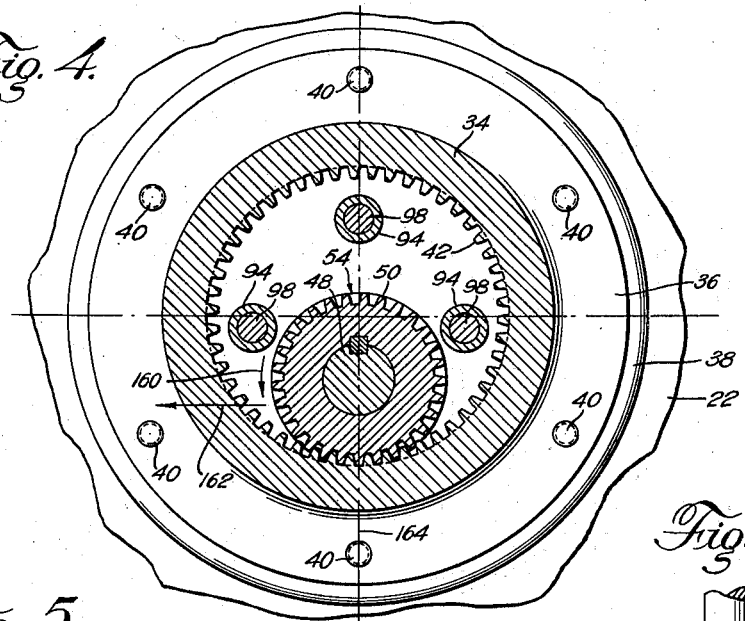
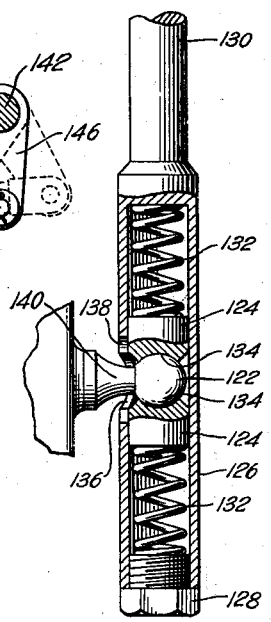
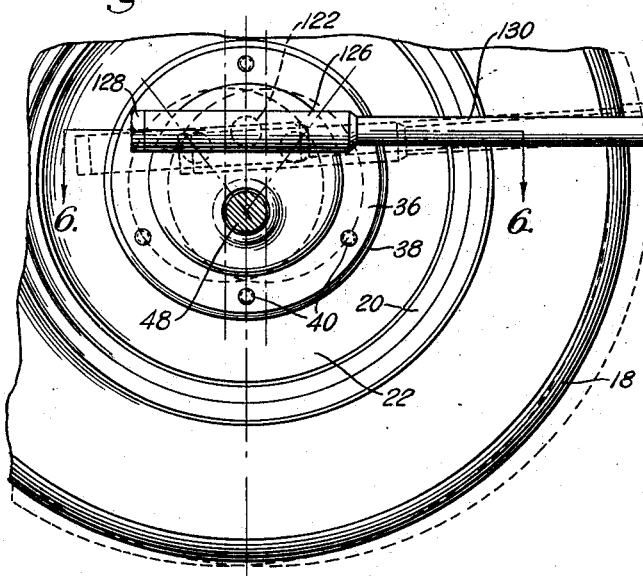
Earnest J. Conger
INVENTOR
BY Victor J. Evans & Co.
HIS ATTORNEYS Patented June 13, 1939

2,162,606

UNITED STATES PATENT OFFICE 2,162,606

WHEEL DRIVE

Earnest J. Conger, Crawfordsville, Ind., assignor of fifteen per cent to Raymond H. Allen, fifteen per cent to Claude Mitchell, fifteen per cent to William Pearlman, and fifteen per cent to Leo Massing, all of Crawfordsville, Ind.

Application February 8, 1938, Serial No. 189,417

4 Claims. (Cl. 180—10)

My invention relates to drive wheels and driven wheels of vehicles and other types of mechanical carriers and includes among its objects and advantages the provision of novel means whereby the static pressure of a load carried by the vehicle may be utilized to supplement the propelling forces driving the vehicle.

In the accompanying drawings:

Fig. 1 is an elevational view of a portion of a truck chassis embodying my invention;

Fig. 2 is a view taken from the position indicated by line 2—2 of Fig. 1;

Fig. 3 is an enlarged sectional view taken along the line 3—3 of Fig. 1;

Fig. 4 is a sectional view along the line 4—4 of Fig. 3;

Fig. 5 is a view taken from the position indicated by line 5—5 of Fig. 3; and

Fig. 6 is a sectional view along the line 6—6 of Fig. 5.

In the embodiment selected to illustrate my invention, I make use of a truck frame 10 including the usual axle and differential housings 12 and 14, respectively. In Fig. 2, I illustrate the axle housing 12 as being associated with two traction wheels 16 which may be of conventional construction with the exception of the hub area within which my invention is incorporated.

In Fig. 3, I illustrate one of the traction wheels 16 as comprising the usual inflated tire 18 assosiated with the rim 20 welded to a disk 22. Disk 22 is offset at 24 to provide a wall having frictional relation with the flange 26 of a hub cap 28. Disk 22 is provided with a central opening 30 for accommodating the hub structure 32 while the annular body 34 of the hub structure includes a flange 36 lying adjacent the wall 38 of the disk 22 and fixedly connected thereto by bolts 40 threaded into the flange 36.

The annular body 34 includes an internal gear 42 and tracks 44 located on opposite sides of the internal gear 42 and arranged concentrically therewith. The axle part 46 within the axle housing 12 includes a reach 48 lying inside the annular body 34 and provided with a pinion 50 keyed thereto and arranged in mesh with the internal gear 42. Reach 48 terminates in a reach 52 of slightly smaller diameter upon which I mount a cargo wheel 54 having pressure relation with one of the tracks 44. A second cargo wheel 56 is mounted on the reach 48 for pressure relation with the other track 44. Cargo wheels 54 and 56 are of the same diameter, but the wheels are of smaller diameter than the tracks 44 while the pinion 50 is smaller than the internal gear 42.

Upon the reach 48 I mount a bearing collar 58 for supporting bearing rollers 60. The collar 58 is arranged in abutting relation with an abutment 62 on the axle part 46. Cargo wheel 56 comprises a bearing collar 64 positioned between the bearing collar 58 and one side of the pinion 50. Roller bearings 66 are housed between the bearing collar 64 and the outer retainer 68 of the cargo wheel 56. Cargo wheel 54 comprises a bearing collar 70 positioned between the pinion 50 and a bearing collar 72 mounted on the reach 52 and the axle part. Roller bearings 74 are housed between the bearing collar 70 and the outer retainer 76 of the cargo wheel 54. Bearing collar 72 supports roller bearings 78 while a nut 80 having threaded relation at 82 with the axle part has pressure relation with the collar. Thus, mere tightening of the nut 80 holds the collars 58, 64, 70 and 72 in assembled relation upon the axle part.

Closure plates 84 and 86 extend across the ends of the annular body 34. The plate 84 includes a bearing surface 88 having pressure relation with the roller bearings 78 while the plate 86 includes a bearing surface 90 having pressure relation with the roller bearings 60. The ball bearings 92 are interposed between the plates 84 and 86 and the annular body 34. Between the plates 84 and 86 I position a plurality of tubular spacers 94. The plates 84 and 86 are provided with bores 96 aligned with the tubular spacers 94 for the reception of bolts 98 which may be tightened through the medium of nuts 100 for drawing the plates 84 and 86 into pressure relation with the ends of the tubular spacers 94, thus drawing the parts into a rigid and unitary assembly.

Upon the end of the housing 12 I mount a head 102 which carries a suitable bearing 104 associated with the reach 106 of the axle part 46. A collar 108 is keyed to the reach 110 of the axle part and includes a flange 112 riveted to a conventional brake drum 114 within which are housed conventional brake means 116. To the head 102 I connect an anchor plate 118 by bolts 120. Drum 114 rotates with the axle part 46. With this exception, the brake mechanism may be of the conventional type employed in automobiles, trucks, and the like.

One of the bolts 98 includes a head 122 which is positioned between blocks 124 slidable in a tube 126 (see Fig. 6). One end of the tube includes a screw plug 128, and the opposite end is formed integrally with a rod 130. Compression springs 132 have pressure relation with the blocks 124, the screw plug 128 and the opposite end of the tube. The blocks 124 have curved recesses 134 for partly embracing the head 122 so as to hold it in connected relation therewith. Springs 132 are of equal tension and normally support the head 122 in the position of Fig. 6. The tube 126 includes an opening 136 of sufficient diameter to receive the head 122 for assembly purposes while the tube includes a slot 138 of such proportions as to slidably receive the neck 140.

In Figs. 1 and 2, I illustrate the frame 10 as being provided with a cross shaft 142 rotatably journaled in bearings 144 attached to the frame members. The outer ends of the shaft 142 are provided with right angular arms 146 to the lower ends of which the rods 130 are pivotally connected. A rod 148 has one end pivotally connected with one of the arms 146 and its opposite end pivotally connected with the lower end of a lever 150 pivotally mounted at 152 on one of the frame members 10. The lever includes a large pawl 154 arranged to engage the quadrant 156. Lever 150 may be shifted to different positions for swinging one of the arms 146, which, in turn, rotates the shaft 142 and imparts swinging movement to the other arm 146 so that both rods 130 are moved at the same time.

The axle housing 12 serves as a mounting for the springs 158 in the manner of conventional spring mountings. In operation, power is applied to the traction wheel 16 through the medium of the pinion 50 and the internal gear 42. Both wheels are identical in construction so that the description of the wheel structure illustrated in Fig. 3 will apply to both. Cargo wheels 54 and 56 while being coaxially mounted with respect to the pinion 50 are of such diameters as to carry all the load between the axis part and the wheel structure. Plates 84 and 86 while being connected as a unit support none of the load but may turn freely with respect to the annular body or hub part 34.

Referring to Fig. 4, we shall assume that the pinion 50 rotates in the direction of the arrow 160 for propelling the vehicle in a forward direction. Since the internal gear 42 is considerably larger in diameter than the pinion 50, the latter is free to climb the internal gear depending upon the power applied and resistance forces applied to the traction wheel. The pinion 50 while supporting one of the load constitutes a positive connection between the axle part and the internal gear for shifting the static load. Any shifting of the pinion within the internal gear imparts similar shifting to the cargo wheels 54 and 56 along the tracks 44.

With no power applied to the pinion 50, it will take the position of Fig. 4, at which time the axis of the pinion is vertically aligned with respect to the axis of the internal gear 42 or the traction wheel 16. In other words, with no forces applied, the pinion 50 will take the lowest position inside the internal gear. As power is applied, the pinion will tend to climb inside the internal gear which will cause the cargo wheels 54 and 56 to advance in the direction of the arrow 162, thus bringing their points of contact with the tracks 44 to one side of the axis line 164. Such shifting of the cargo wheels brings the static load into off-center relation with the axis of the traction wheel, thus suppplementing the propelling forces applied to the pinion for moving the vehicle. The degree of offset relation or climbing of the pinion within the internal gear will depend upon the power applied to the pinion or obstructions in the path of the traction wheel. The greater the obstruction or resistance as well as increased power applied to the pinion will advance the cargo wheels in a further degree, thus increasing the supplemental action of the static load as an aid to the power applied. Any shifting movement of the cargo wheels relatively to the annular body 34 causes relative rotary movement between the plates 84 and 86 and the annular body. Since the plates are freely related to the annular body, the pinion 50 as well as the cargo wheels are highly sensitive to variable power applied and resisting forces so as to immediately bring into play the static load as a supplemental aid to the power applied for propelling purposes.

While I have described the shifting action of the pinion 50 and the cargo wheels 54 and 56 in connection with the advanced travel of the vehicle, the pinion and the cargo wheels operate in the same manner when the vehicle is reversed. Any shifting of the pinion and the cargo wheels imparts oscillatory movement to the plates 84 and 86 since the axle part passes through the disks at a point considerably below the axis of the traction wheel. While the shifting of the pinion and the cargo wheels as a unit is entirely automatic, advancement or recession of the movement may be accelerated or retarded by shifting the lever 150 forwardly or rearwardly, respectively. The full line position of the lever illustrates the neutral adjustment. Head 122 is located above the axis of the traction wheel so that shifting of the lever is effective in applying oscillatory forces to the plates 84 and 86. The plates swing freely to accommodate the action of the pinion and the cargo wheels. However, the plates 84 and 86 prevent lateral shifting of the annular body or hub part 34, thus keeping the traction wheel in line in addition to serving as a shield against the entrance of dust as well as retaining functions for lubrication purposes.

While I have illustrated the invention in combination with a truck or automobile wheel, together with lever means for accelerating or retarding oscillatory movement of the plates 84 and 86, it will be understood that the pinion and cargo wheels will operate in the same manner independently of such additional structure. In addition, in some types of wheel construction the pinion and internal gear may be eliminated.

Without further elaboration, the foregoing will so fully explain my invention that others may, by applying current knowledge, readily adapt the same for use under various conditions of service.

I claim:

1. The combination of a load carrying wheel having a hub, an axle extending into said hub and located beneath the axis of the load carrying wheel, internal track means inside the hub and concentrically arranged therewith, means cooperable on the axle and said track means for shifting the axle laterally of the axis of the load carrying wheel in response to inertia forces on the wheel, said means comprising rotary elements of smaller diameter than the track means and normally lying with their axes vertically aligned with the axis of the load carrying wheel, closure plates rotatably related to the hub and said axle, and manually actuated means connected with said plates for rotating the same and for urging the axle laterally of the axis of the load carrying wheel.

2. The combination of a load carrying wheel having a hub, an axle extending into said hub and located beneath the axis of the load carrying wheel, internal track means inside the hub and concentrically arranged therewith, means cooperable on the axle and said track means for shifting the axle laterally of the axis of the load carrying wheel in response to inertia forces on the wheel, said means comprising rotary elements of smaller diameter than the track means and normally lying with their axes vertically aligned with the axis of the load carrying wheel, closure plates rotatably related to the hub and said axle, manually actuated means connected with said plates for rotating the same and for urging the axle laterally of the axis of the load carrying wheel, and brake means connected with said axle.

3. The combination of a load carrying wheel having a hub provided with an internal gear and a track, a power axle extending into said hub, a pinion keyed to the power axle and arranged in mesh with said internal gear, said power axle normally taking a position vertically beneath the axis of the load carrying wheel, said pinion being materially smaller in diameter than the internal gear, a cargo wheel arranged concentrically about the power axle and arranged to run on said track, closure plates rotatably related to said hub, and bearing means interposed between said plates and said power axle.

4. The combination of a load carrying wheel having a hub provided with an internal gear and a track, a power axle extending into said hub, a pinion keyed to the power axle and arranged in mesh with said internal gear, said power axle normally taking a position vertically beneath the axis of the load carrying wheel, said pinion being materially smaller in diameter than the internal gear, a cargo wheel arranged concentrically about the power axle and arranged to run on said track, closure plates rotatably related to said hub, bearing means interposed between said plates and said power axle, and bearing means interposed between said plates and the hub.

EARNEST J. CONGER.